United States Patent Office 3,063,893
Patented Nov. 13, 1962

3,063,893
STABILIZED PYRETHRUM COMPOSITIONS
Alan August Goldberg, Nakuru, Kenya Colony, and Harold John Smith, Cardiff, Glamorgan, Wales, assignors to The Pyrethrum Board of Kenya, Nakuru, Kenya Colony, a body corporate of Kenya
No Drawing. Filed Nov. 21, 1960, Ser. No. 70,371
Claims priority, application Great Britain Nov. 24, 1959
12 Claims. (Cl. 167—24)

This invention relates to insecticidal compositions and more especially to compositions containing extracts of pyrethrum.

It is known that pyrethrum extract, as obtained by extracting dried, ground pyrethrum flowers, contains four active ingredients which are respectively known as Pyrethrins I and II and Cinerins I and II. Pyrethrin I and Cinerin I are those potent insecticides against certain crawling insects whilst Pyrethrin II and Cinerin II are more potent against certain flying insects. We have already found that it is possible to effect a partial separation of the materials of differing activity by distilling the crude extract with a mixture of normally liquid paraffin hydrocarbons at a pressure sufficiently low substantially to avoid thermal decomposition and degradation of the pyrethrins. The use of other codistillants such as the piperonal alkoxides is also known. The present invention relates to the stabilisation of the pyrethrins and cinerins irrespective of whether they have been separated or of the manner in which they may have been separated from the accompanying oleo-resin and regardless of whether or not a composition having an enhanced concentration of particular ingredients has been obtained.

Hitherto, one of the main disadvantages in the use of pyrethrin-containing insecticides has been the fact that in the presence of light and air they lose their activity rather rapidly. On the other hand, pyrethrum extracts have the outstanding advantage that they are non-toxic to human beings and animals and thus may be safely used on crops intended for human or animal consumption right up to the time of harvesting. In this important respect they differ markedly from such important synthetic insecticides as chlorinated hydrocarbons and organic compounds of phosphorus. There is thus a need for a pyrethrum extract of markedly improved stability.

A number of attempts have been made to provide stabilised pyrethrum extracts but, on the whole, these have not been very successful. Aromatic compounds such as aminophenols, aminobenzene carboxylic acids and their esters and aminoanthraquinones have been proposed for this purpose. Some of these have improved the stability of pyrethrum extracts to some extent, but not to a sufficient degree to be entirely acceptable, and to be unobjectionable if present in a food product. On the other hand, a considerable amount of protection is provided by the addition to such extracts of 4-amino-azobenzene (see U.S. patent specification No. 2,772,198). However, the resulting composition cannot be used on crops intended for human or animal consumption since this compound has been demonstrated to possess powerful carcinogenic properties when applied to mammals by either the oral or the subcutaneous route (J. L. Hartwell, National Cancer Institute, National Institutes of Health, Bethesda, Md., "Survey of Compounds Which Have Been Tested for Carcinogenic Activity," 1951).

It has now been found that two dyestuffs containing phenylazo groups, which have been accepted by competent authorities in Great Britain, Western Germany and the United States of America as suitable for incorporation in foodstuffs, can be used as stabilisers for pyrethrum extracts. These dyestuffs are 1-phenylazo-2-amino-naphthylamine (Colour Index No. 11380: Colour Index Food Yellow 10) and 2:4-dihydroxyazobenzene (Colour Index No. 11920: Colour Index Food Orange 3). The action of these dyestuffs appears to be quite specific: thus the closely related 1-orthotoluylazo-2-aminonaphthylamine, which may also be incorporated in foodstuffs, has insufficient activity for the present purpose.

Accordingly, the present invention provides an insecticidal composition of improved stability to light and air which comprises one or more pyrethrins and/or cinerins and one of the said two dyestuffs. Such compositions preferably also include a mutual solvent for the pyrethrins and/or cinerins and for the selected dyestuff which is inert with respect thereto, and behaves as a carrier: for example, a fraction of normally liquid paraffins alone or admixed with an aromatic hydrocarbon fraction such as toluene and/or mixed xylenes. Alternatively, a finely divided solid inert extender such as talc may be used.

According to a further feature of the invention the insecticidal composition may include at least one emulsifying agent. Such compositions may be homogeneous solutions containing a non-ionic emulsifying agent such as a polyethenoxy ether of an alkylated phenol, or an alkali metal or amine salt of an anionic emulsifying agent such as a neutral sodium or amine salt of a branched chain alkylbenzene sulphonic acid, for example, the triethanolamine salt of a dodecylbenzene sulphonic acid in which the dodecyl group is derived from a propylene tetramer, a sodium or triethanolamine salt of an alkylated naphthalene sulphonic acid, a sodium or triethanolamine salt of an alkyl ester of sulphosuccinic acid such as sodium di-isobutyl or di-ethylhexyl sulphosuccinate, a sodium salt of a long chain N-alkylated taurine such as N-oleyl-N-methyltaurine or a sodium or triethanolamine salt of a sulphated fatty alcohol such as sodium n-dodecyl sulphate. Such preparations may be anhydrous emulsifiable concentrates or they may be emulsions with water, both of which can be further diluted with water at the site immediately prior to use, with or without inversion of phase. A solution in an organic solvent of the selected dyestuff may be dispersed in an emulsion of the pyrethrum extract at any time prior to use.

A pyrethrin synergist such as a piperonal alkoxide, for example, piperonal butoxide, is also preferably present in the compositions of the invention. It may be present in the pyrethrum extract as prepared or may be introduced into the compositions of the invention at any desired stage prior to use. There is a most marked synergistic effect when a piperonal alkoxide and one of the azo dyes are simultaneously present in the pyrethrum extract. For example, the half life period of a mixture of equal weight of pyrethrum extract and dyestuff is about 13 times that of the pyrethrum extract alone, but, when the mixture is admixed with its own weight of piperonal butoxide, the half life period is about 70 times that of the half life period of the pyrethrum extract alone. The piperonal butoxide itself exerts a relatively small stabilising effect upon pyrethrum extracts.

To prepare the compositions of the invention in the form of free flowing powders a solution of the pyrethrum extract or of a distillate containing one or more fractions thereof and with or without a synergist therefor is mixed with a solution of the selected dyestuff. The solvents present in the said solutions should be mainly volatile solvents and readily miscible, for example, low boiling hydrocarbons or ethanol. The resulting solution is then used to impregnate a finely divided solid inert suitable extender such as ground pyrethrum marc or talc. Conventional impregnating and mixing apparatus can be employed for this operation, but it is desirable that as little light should be allowed to fall upon the materials during this operation as possible. If it is intended to suspend the impregnated carrier in water prior to application to vegetation the impregnant may also include a suitable suspending agent.

In making the compositions in accordance with the invention the constituents thereof may be present in any desired proportions. Pyrethrins are available (a) as an oleoresin extract which usually contains 25-35% by weight of pyrethrins and cinerins, together with various resins and other impurities derived from the extraction of the pyrethrum flowers, (b) as a solution in a synergist which is usually a piperonal alkoxide and in which the latter may greatly preponderate or (c) as a solution which has been produced by the distillation or codistillation of a solution of pyrethrum oleoresin extract in a fraction of normally liquid paraffinic hydrocarbons which distills between 200 and 500° C. Such codistillation is carried out at a pressure which is sufficiently low substantially to avoid thermal decomposition and degradation of the pyrethrin present. Such compositions may contain 25% by weight of pyrethrins and cinerins or even more and constitute a highly desirable starting material for use where application to crops intended for food is to be carried out.

It is desirable to correlate the proportion of azo dyestuff and of synergist, when present, with the actual amount of pyrethrins and cinerins present in order to secure sufficient protection. The amount of azo dyestuff may be from 50 to 250% by weight of the pyrethrins and cinerins, but is preferably from 100 to 200% by weight thereof. The amount of piperonal alkoxide may be from 50% to 2000% by weight of the pyrethrins and cinerins and is preferably from 100 to 1500% of the weight thereof. The proportion of emulsifying or suspending agent will depend partly upon the nature thereof and partly upon the relative proportions of the other ingredients but can readily be ascertained by a few simple experiments.

The protection afforded by the addition of the two indicated dyestuffs to pyrethrum extracts, and with or without addition of a piperonal alkoxide, may be determined by exposing thin layers of solutions containing known amounts of pyrethrum extract, both with and without the proposed additives, in dishes covered with glass or quartz lids to solar radiation for predetermined periods and then analysing the contents of the dish chromatographically by the method described by Smith ("Detection and Estimation of the Biologically Active Constituents of Pyrethrum," J. Sci. Food Agric. 1960, pages 172-6). A glass cover cuts off all radiation having a wavelength below 3200 Angstrom units whilst a quartz plate permits the passage of radiation having wavelengths between 2000 and 7000 Angstrom units. Alternatively, prior to exposure, the solvent may first be evaporated and the residual film then exposed in an uncovered dish. The intensity of solar radiation in the Kenya Highlands at latitude 0° and altitude 6,500 feet, where the examples were carried out is of the order of 90,000 to 100,000 lux. At the indicated altitude solar radiation contains a higher proportion of ultra-violet radiation than it does at sea level.

The following examples illustrate the nature of the invention:

Example 1

Aqueous alcoholic solutions containing 0.3% of pyrethrins and similar solutions containing 0.3% of pyrethrins and 0.3% of the protecting agent are prepared. 10 cc. of each solution is poured onto a Petri dish plate and the plates then exposed side by side to solar radiation of an intensity of circa 100,000 lux for 8 hours. Each Petri dish is covered by a quartz or glass plate during this period to retard evaporation. Initially the solution is 3.0 mm. deep and at the end of the exposure circa 1.0 mm. deep. Chromatographic analysis for pyrethrins gives the following results:

| Solution | Percentage of Initial Pyrethrins Remaining after— | |
|---|---|---|
| | keeping in dark for 8 hours | exposure to solar radiation for 8 hrs. under quartz lid |
| (i) Pyrethrins alone (control) | 99 | 16 |
| (ii) Pyrethrins plus C.I.F. Yellow 10 | 100 | 90 |
| (iii) Pyrethrins plus C.I.F. Orange 3 | 100 | 85 |
| (iv) Pyrethrins plus ethyl para-aminobenzoate | 100 | 32 |
| (v) Pyrethrins plus tertiary-butyl salol | 100 | 62 |

| Solution | Percentage of Original Pyrethrins Remaining after— | |
|---|---|---|
| | keeping in dark for 8 hours | exposure to solar radiation for 8 hrs. under glass |
| (i) Pyrethrins alone (control) | 100 | 26 |
| (ii) Pyrethrins plus C.I.F. Yellow 10 | 100 | 97 |
| (iii) Pyrethrins plus C.I.F. Orange 3 | 100 | 95 |
| (iv) Pyrethrins plus ethyl para-aminobenzoate | 100 | 28 |

The two dyestuffs are seen to be much more effective protecting agents for the pyrethrins than ethyl para-aminobenzoate or tertiary-butyl salol when a quartz cover is used. It is assumed that owing to the cut-off of the shorter wavelengths by glass the control figure is higher when exposure takes place through the latter, but so also are those for the two dyestuffs whilst that for the ester is somewhat lower.

Example 2

A set of alcoholic solutions containing 0.3% pyrethrins alone or 0.3% pyrethrins plus 0.3% protecting agent are prepared. 10 cc. of each solution is poured into the bottom of a Petri dish having a diameter of 9 cm., and the solutions evaporated in a current of warm, moving air in order to leave the solution evenly distributed as a dry film over the surface of the dish. The results obtained after exposure in uncovered dishes are:

| Dry Film | Percentage of Initial Pyrethrins Remaining after— | |
|---|---|---|
| | keeping in dark for 8 hours | exposure to sunlight for 8 hours |
| (i) Pyrethrins alone (control) | 98 | 17 |
| (ii) Pyrethrins plus C.I.F. Yellow 10 | 100 | 97 |
| (iii) Pyrethrins plus C.I.F. Orange 3 | 100 | 90 |
| (iv) Pyrethrins plus ethyl para-amino benzoate | 100 | 57 |
| (v) Pyrethrins plus C.I.F. Orange 3 plus ethyl para-aminobenzoate | 100 | 99 |

In this example the films are exposed to full solar radiation. After 8 hours only one sixth of the pyrethrins remained unchanged in the control, but those specimens containing the dyestuffs still retained at least 90% of their initial activity. The presence of an additional antioxidant still further improved the results.

Example 3

Three water-miscible pyrethrum concentrates each containing 5% by weight of pyrethrins are prepared by admixing:

I. Distilled pyrethrum extract (50% pyrethrins; 50 g.), Oil Yellow G Extra (C.I.F. Orange 3, 25 g.), emulsifying agent (commercial polyethenoxy ether of para-tertiary-octyl-phenol; 200 g.), piperonyl butoxide (50 g.) and sufficient xylene to give a final volume of 500 cc.

II. Distilled pyrethrum extract (50% pyrethrins; 50 g.), Oil Yellow G Extra (C.I.F. Orange 3; 25 g.), commercial emulsifying agent as under I (200 g.) and sufficient xylene to give a final volume of 500 cc.

III. Oleoresin pyrethrum extract (25% pyrethrins; 100 g.), commercial emulsifying agent as under I (200 g.) and sufficient xylene to give a final volume of 500 cc.

An aliquot (0.5 g.) of each concentrate is placed in a Petri dish (88 mm. diameter), xylene (0.25 g.) is added to each dish and a film obtained upon the bottom of the dish by rotating the dish. This film contains 25 mg. of pyrethrins in each case. Initially the film is 125 micron thick but this decreases to circa 50–60 microns when exposed to the sun. A series of such sets of three films is prepared.

The sets of three plates are exposed to solar radiation of intensity 80,000 to 100,000 lux and at timed intervals plates are withdrawn, each film separately dissolved in alcohol and submitted to chromatographic analysis by the method of Smith, loc. cit., in order to determine the amount of residual pyrethrins.

The following results are obtained:

| Preparation | Exposure Time, hours | Percent of Initial Pyrethrins remaining |
|---|---|---|
| I | 0 | 100 |
|   | 4 | 94 |
|   | 8 | 90 |
|   | 16 | 84 |
|   | 24 | 80 |
| II | 0 | 100 |
|   | 4 | 72 |
|   | 8 | 58 |
|   | 16 | 46 |
|   | 24 | 35 |
| III | 0 | 100 |
|   | ½ | 71 |
|   | 1 | 44 |
|   | 2 | 31 |

If curves are constructed from the above data it can be found that the "half-life" of the pyrethrins in each case is as follows. (The "half-life" is the time taken for 50% of the pyrethrins to decompose):

| Preparation | Additive | Half Life, hours |
|---|---|---|
| I | C.I.F. Orange 3 and piperonyl butoxide | 75 |
| II | C.I.F. Orange 3 | 13.4 |
| III | None | 1.05 |

The protection given to pyrethrum films by the said dyestuffs, C.I.F. Yellow 10 and C.I.F. Orange 3 is also shown by spraying films of a solution of 0.25% pyrethrins and 0.25% stabiliser in alcohol on to glass plates or large leaves, allowing these films to evaporate, exposing the plates or leaves to solar radiation for given periods, confining a given number of insects of the species *Tribolium castaneum* per unit area of surface to crawl upon the thus treated films and determining the proportion of the insects which are paralysed in a given time. The results are in close agreement with those given in the tables.

We claim:

1. An insecticidal composition having as an active constituent thereof at least one insecticide present in pyrethrum extract and containing, as a stabiliser therefor, a dyestuff suitable for incorporation in foodstuffs selected from the group consisting of 1-phenylazo-2-aminonaphthylamine and 2,4-dihydroxyazobenzene present in an amount of from 50 to 250% of the weight of said insecticide.

2. An insecticidal composition having as an active constituent thereof at least one pyrethrin and containing, as a stabiliser therefor, 1-phenylazo-2-aminonaphthylamine present in an amount of from 100 to 200% of the weight of said insecticide.

3. An insecticidal composition having as an active constituent thereof at least one pyrethrin and containing, as a stabiliser therefor, 2,4-dihydroxyazobenzene present in an amount of from 100 to 200% of the weight of said insecticide.

4. An insecticidal composition having as an active constituent thereof at least one insecticide present in pyrethrum extract and containing (a) a piperonal alkoxide present in an amount of 50 to 2000% of the weight of said insecticide, and (b) a dyestuff suitable for incorporation in foodstuffs selected from the group consisting of 1-phenylazo-2-aminonaphthylamine and 2,4-dihydroxyazobenzene, said dyestuff being present in an amount of from 50 to 250% of the weight of said insecticide.

5. An insecticidal composition comprising (a) at least one insecticide present in pyrethrum extract, (b) a piperonal alkoxide having less than nine carbon atoms in the alkoxide group present in an amount of 50 to 2000% of the weight of said insecticide, (c) a dyestuff suitable for incorporation in foodstuffs selected from the group consisting of 1-phenylazo-2-aminonaphthylamine and 2,4-dihydroxyazobenzene, which dyestuff is present in an amount of 50 to 250% of the weight of said insecticide, and (d) an inert carrier therefor.

6. The composition according to claim 5 in which the carrier is an inert liquid diluent.

7. The composition according to claim 5 in which the carrier is a finely divided solid inert carrier.

8. An insecticidal composition comprising (a) at least one pyrethrin, (b) piperonal butoxide present in an amount of 100 to 1500% of the weight of said insecticide, (c) a dyestuff suitable for incorporation in foodstuffs selected from the group consisting of 1-phenylazo-2-aminonaphthylamine and 2,4-dihydroxyazobenzene, which dyestuff is present in an amount of 100 to 200% of the weight of said insecticide, and (d) an inert carrier thereof.

9. The composition according to claim 8 in which the carrier is an inert liquid diluent.

10. The composition according to claim 8 in which the carrier is a finely divided inert solid carrier.

11. An insecticidal composition comprising (a) at least one insecticide present in pyrethrum extract, (b) a piperonal alkoxide having less than nine carbon atoms in the alkoxide group present in an amount of 50 to 2000% of the weight of said insecticide, (c) a dyestuff suitable for incorporation in foodstuffs selected from the group consisting of 1-phenylazo-2-aminonaphthylamine and 2,4-dihydroxyazobenzene, which dyestuff is present in an amount of 50 to 250% of the weight of said insecticide, (d) an innocuous antioxidant and (e) an inert carrier therefor.

12. The composition as defined in claim 11 in which the innocuous antioxidant is ethyl para-aminobenzoate.

References Cited in the file of this patent

UNITED STATES PATENTS 2,772,198   Smith ---------------- Nov. 27, 1956